(12) United States Patent
Dwyer et al.

(10) Patent No.: US 10,823,754 B2
(45) Date of Patent: Nov. 3, 2020

(54) ACCELEROMETER WITH STRAIN COMPENSATION

(71) Applicant: Honeywell International Inc., Morristown, NJ (US)

(72) Inventors: Paul W. Dwyer, Seattle, WA (US); Stephen F. Becka, North Bend, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 14/542,277

(22) Filed: Nov. 14, 2014

(65) Prior Publication Data

US 2016/0139170 A1 May 19, 2016

(51) Int. Cl.
*G01P 15/08* (2006.01)
*G01P 15/097* (2006.01)
*G01P 15/03* (2006.01)
*G01P 21/00* (2006.01)
*G01L 1/22* (2006.01)

(52) U.S. Cl.
CPC ............... *G01P 15/03* (2013.01); *G01L 1/22* (2013.01); *G01P 15/0802* (2013.01); *G01P 15/097* (2013.01); *G01P 21/00* (2013.01); *G01P 2015/0817* (2013.01)

(58) Field of Classification Search
None
See application file for complete search history.

(56) References Cited

U.S. PATENT DOCUMENTS

| 4,498,344 | A | * | 2/1985 | Dinger | ................... G01B 7/16 |
|||||| 73/702 |
| 4,879,914 | A | | 11/1989 | Norling | |
| 4,901,586 | A | | 2/1990 | Blake et al. | |
| 4,939,935 | A | | 7/1990 | Amand | |
| 5,005,413 | A | | 4/1991 | Novack et al. | |
| 5,265,473 | A | | 11/1993 | Funabashi | |
| 5,379,639 | A | | 1/1995 | Hulsing, II et al. | |
| 5,458,000 | A | * | 10/1995 | Burns | ................ G01D 3/0365 |
|||||| 73/497 |
| 5,594,170 | A | | 1/1997 | Peters | |

(Continued)

FOREIGN PATENT DOCUMENTS

| EP | 0674761 | B1 | 10/1997 | |
| JP | 04363670 | A | * 12/1992 | ............ G01P 15/097 |
| WO | 2006039560 | A2 | 4/2006 | |

OTHER PUBLICATIONS

Lee, J.E.-Y. et al., "An axial strain modulated double-ended tuning fork electrometer," Elsevier Sensors and Actuators A 148, Sep. 2008, pp. 395-400.

(Continued)

*Primary Examiner* — Jill E Culler
*Assistant Examiner* — Ruben C Parco, Jr.
(74) *Attorney, Agent, or Firm* — Shumaker & Sieffert, P.A.

(57) ABSTRACT

In some examples, a device comprises a proof mass and a support base configured to support the proof mass, wherein the proof mass is configured to displace in response to an acceleration of the device. The device also comprises a flexure configured to flexibly connect the proof mass to the support base. The device also comprises a strain-monitoring device configured to measure an amount of strain on the support base.

11 Claims, 9 Drawing Sheets

(56) References Cited

U.S. PATENT DOCUMENTS

| | | | |
|---|---|---|---|
| 5,783,973 A | 7/1998 | Weinberg et al. | |
| 5,969,249 A | 10/1999 | Roessig et al. | |
| 6,145,380 A | 11/2000 | MacGugan | |
| 6,230,565 B1 * | 5/2001 | Foote | G01P 15/097 73/497 |
| 6,248,610 B1 | 6/2001 | Leonardson et al. | |
| 6,453,744 B2 | 9/2002 | Williams | |
| 6,484,578 B2 | 11/2002 | Woodruff et al. | |
| 6,595,054 B2 | 7/2003 | Paros et al. | |
| 6,634,231 B2 | 10/2003 | Malametz | |
| 6,662,658 B2 | 12/2003 | Foote | |
| 6,826,960 B2 | 12/2004 | Schaad et al. | |
| 7,178,401 B2 | 2/2007 | Byrd | |
| 7,467,553 B2 | 12/2008 | Meyer | |
| 7,954,215 B2 | 6/2011 | Saito | |
| 8,955,382 B2 | 2/2015 | Dwyer et al. | |
| 9,261,525 B2 | 2/2016 | Thiruvenkatanathan et al. | |
| 2003/0196489 A1 * | 10/2003 | Dwyer | B81C 1/00666 73/497 |
| 2006/0225506 A1 | 10/2006 | Madni et al. | |
| 2007/0236213 A1 | 10/2007 | Paden et al. | |
| 2009/0241665 A1 | 10/2009 | Novack | |
| 2010/0186515 A1 * | 7/2010 | Sakurai | G01L 9/0022 73/702 |
| 2011/0100125 A1 | 5/2011 | Sato | |
| 2011/0234206 A1 * | 9/2011 | Kawakubo | G01P 15/18 324/162 |
| 2012/0132003 A1 | 5/2012 | Comi et al. | |
| 2012/0192649 A1 | 8/2012 | Strehlow et al. | |
| 2012/0227492 A1 * | 9/2012 | Dwyer | G01C 19/5607 73/504.16 |
| 2013/0298675 A1 | 11/2013 | Thiruvenkatanathan et al. | |
| 2013/0333175 A1 | 12/2013 | Acar et al. | |
| 2014/0253219 A1 | 9/2014 | Caffee et al. | |

OTHER PUBLICATIONS

Seshia, A.A. et al., "A Vacuum Packaged Surface Micromachined Resonant Accelerometer," Journal of Microelectromechanical Systems, vol. 11, No. 6, Dec. 2002, pp. 784-793.

Extended Search Report from counterpart European Application No. 15193762.0, dated Apr. 8, 2016, 7 pp.

U.S. Appl. No. 14/542,323, by Honeywell International Inc. (Inventors: Stephen F. Becka), filed Nov. 14, 2014.

Response to Office Action dated Sep. 16, 2016, from U.S. Appl. No. 14/542,323, filed Dec. 9, 2016, 9 pp.

Response to Extended European Search Report and Opinion, pursuant to Rule 62 EPC, dated Apr. 8, 2016, from counterpart European Application No. EP 15193762.0, filed on Nov. 9, 2016, 52 pp.

Communication pursuant to Article 94(3) EPC from counterpart European Application No. 15193762.0, dated Dec. 7, 2016, 3 pp.

Office Action from U.S. Appl. No. 14/542,323, dated Sep. 16, 2016, 13 pp.

Response to Article 94(3) EPC Communication dated Dec. 7, 2016, from counterpart European Application No. EP 15193762.0, filed on Apr. 3, 2017, 6 pp.

Notice of Allowance from U.S. Appl. No. 14/542,323, dated Apr. 12, 2017, 5 pp.

Office Action from U.S. Appl. No. 14/542,323, dated Feb. 3, 2017, 12 pp.

Notice of Intention to Grant from European Application No. 15193760. 4, dated Jan. 26, 2017, 37 pp.

Office Action, and translation thereof, from counterpart Chinese Application No. 201510774038.9, dated Feb. 2, 2019, 20 pp.

Second Office Action and Search Report, and translation thereof, from counterpart Chinese Application No. 201510774038.9, dated Oct. 11, 2019, 21 pp.

Translation of Response to First Office Action dated Jun. 6, 2019, from counterpart Chinese Application No. 201510774038.9, filed Jun. 17, 2019, 3 pp.

Response to Second Office Action, and translation thereof, dated Dec. 6, 2019, from counterpart Chinese Application No. 201510774038. 9, filed Dec. 25, 2019, 11 pp.

Third Office Action and Search Report, and translation thereof, from counterpart Chinese Application No. 201510774038.9, dated Apr. 24, 2020, 23 pp.

Intent to Grant from counterpart European Patent Application No. 15193762.0, dated Jan. 23, 2018, 72 pp.

* cited by examiner

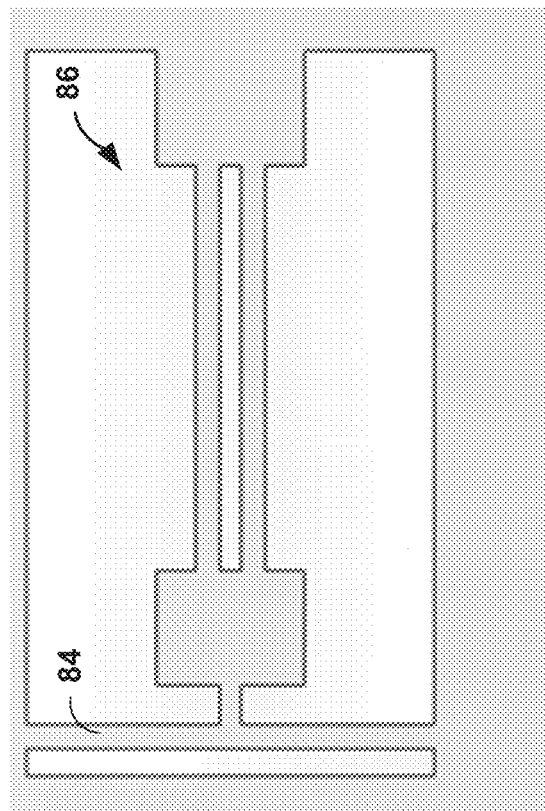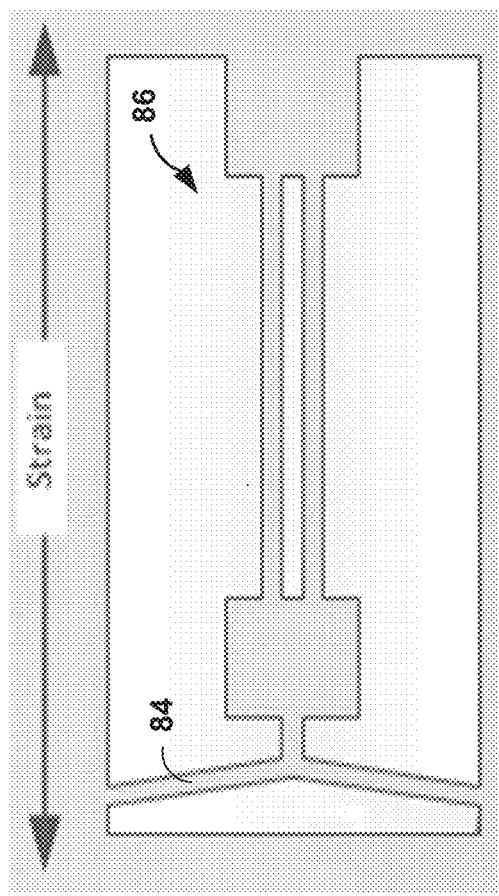
FIG. 5A
FIG. 5B

ACCELEROMETER WITH STRAIN COMPENSATION

TECHNICAL FIELD

This disclosure relates to accelerometers.

BACKGROUND

Accelerometers function by detecting or preventing a displacement of a proof mass under inertial forces. In one example, an accelerometer may detect the displacement of a proof mass by the change in frequency of a double-ended tuning fork (DETF) connected between the proof mass and a support base. In this example, the tines of the DETF may be composed of a piezoelectric material or a silicon material. The DETF is a resonator, which is specifically designed to change frequency proportional to the load applied by the proof mass under acceleration. The DETF resonance is sustained through a plurality of electrodes connecting the DETF to an oscillator, which provides energy to the DETF satisfying the Barkhausen stability criterion.

SUMMARY

In general, the disclosure is directed to devices, systems, and techniques that may enable a device to detect a strain on an accelerometer and compensate for the strain on the accelerometer. For example, an accelerometer configured in accordance with the techniques of this disclosure may include a strain-monitoring device, which may be configured to detect and monitor the strain of the accelerometer. In one example, the strain-monitoring device, which may include a double-ended tuning fork (DETF), may detect changes in the frequency of the tines of the DETF as the strain on the accelerometer varies, and provide data on the changes in frequency to a processor, which enables the processor to compensate an acceleration measurement from the accelerometer for the varying amount of strain on the accelerometer.

In some examples, the frequency of the strain-monitoring device is increased as the strain (e.g., tension) of the accelerometer increases. Conversely, the frequency of the strain-monitoring device is decreased as the strain (e.g., compression) of the accelerometer decreases. In some examples, the strain-monitoring device is located in a plane defined by the accelerometer. In some examples, the strain-monitoring device is made out of the same material as the accelerometer, such that the expansion coefficients between the strain-monitoring device and the accelerometer are nearly the same.

In one example, the disclosure is directed to a device comprising a proof mass, a support base configured to support the proof mass, wherein the proof mass is configured to displace in response to an acceleration of the device, a flexure configured to flexibly connect the proof mass to the support base, and a strain-monitoring device configured to measure an amount of strain on the support base.

In another example, the disclosure is directed to a method comprising receiving, by a processor from an accelerometer, an amount of strain on the accelerometer, receiving, by the processor from the accelerometer, an amount of acceleration of the accelerometer, determining, by the processor, based at least in part on the amount of strain on the accelerometer and the amount of acceleration, a modified acceleration value of the accelerometer, and outputting, by the processor, the modified acceleration value.

In another example, the disclosure is directed to a method of manufacturing an accelerometer, the method comprising masking a substrate with a photoresist, removing material from the substrate to form a plurality of features, wherein the plurality of features comprises a proof mass, a support base configured to support the proof mass, a flexure configured to flexibly connect the proof mass to the support base, and wherein the plurality of features are comprised essentially of the material, and forming a strain-monitoring device.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 3-6 are conceptual diagrams illustrating examples of strain-monitoring devices, in accordance with the techniques described herein.

DETAILED DESCRIPTION

Figure 1:
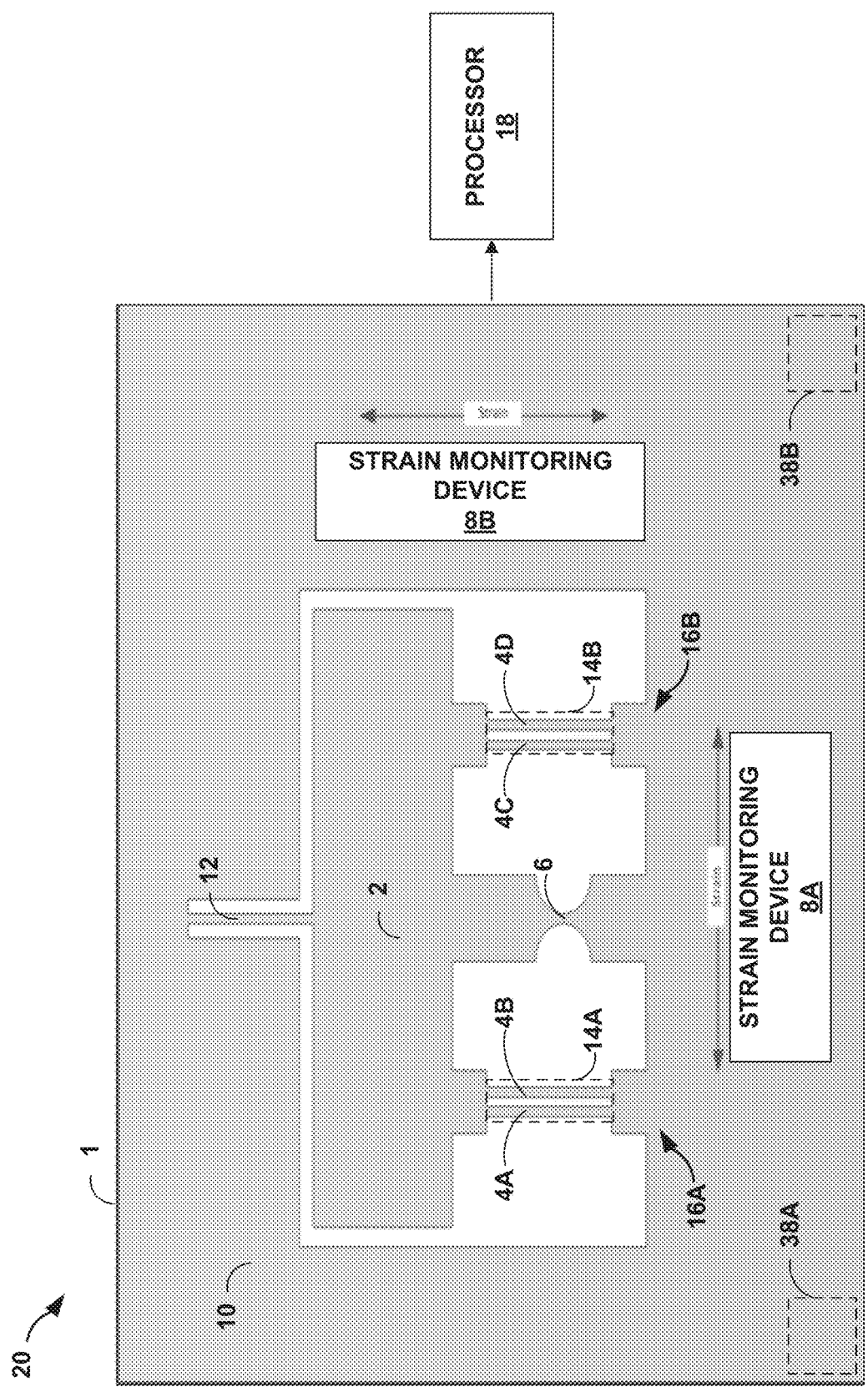
FIG. 1 is a block diagram illustrating an example of an accelerometer system, in accordance with the techniques described herein.

An accelerometer measures acceleration of the accelerometer itself with respect to an inertial reference frame. An accelerometer with double-ended tuning forks (DETFs) use electromagnetic fields in conjunction with a piezoelectric DETF(s) and a movable proof mass to determine a change in displacement of the movable proof mass. The amount of displacement of the proof mass from a neutral position may be proportionate to the magnitude of the acceleration incident upon the accelerometer. However, the accuracy of some accelerometers drifts over time. These inaccuracies may arise from bias instabilities due to a Change in the physical structure of the device caused by Changes in the physical structure of the accelerometer. These changes may occur as a result of aging, strain or strain-relief, and/or time dependent thermal variations, and may include changes in the proof mass position.

Strains caused by stress-relief of material interfaces during device construction may be indistinguishable from acceleration signals. A persistent issue with constructed and modeled accelerometers is that the strain on the accelerometer changes with time as stresses in the construction of the accelerometer relieve. As the strain is variable over time, the model of the accelerometer performance generated by the performance algorithm over time may not accurately represent the behavior of the accelerometer. To prevent the strain from varying over time, some example accelerometer applications may contain a device which monitors temperature or has strain minimizing mechanisms, and the device may be used to indirectly compensate for thermal strains. However, these example accelerometer applications do not directly measure the amount of strain on the accelerometer; moreover, the applications fail to address the strains caused by stress-relief of material interfaces during device construction, and the accumulated inaccuracies of the performance model algorithm over time.

Techniques and devices are disclosed herein that may compensate for errors due to strain, such as strain caused by aging and/or thermal variation, by at least detecting the strain and adjusting the generated acceleration values based on the detected strain. For example, an accelerometer configured in accordance with the techniques of this disclosure may include a strain-monitoring device, which may be configured to detect and monitor the strain of the accelerometer. In some examples, the strain-monitoring device may provide information that may enable a processor to adjust the measured acceleration and compensate far the strain (e.g., increased or decreased strain) of the accelerometer. Such accelerometers may allow for a better performance model algorithm, which may enable a processor to better compensate for the strains placed on the accelerometer, and provide a more accurate acceleration measurement.

Accelerometers configured in accordance with techniques of this disclosure may be created with a single material, which may reduce the impact of time dependent thermal cycles and aging, as monolithic (e.g., single material) accelerometers have one expansion coefficient. That is, such accelerometers may be less subject to bias instabilities and may be more stable as compared to conventional accelerometers. Furthermore, accelerometers configured in accordance with techniques of this disclosure may allow for more accurate accelerometers to be created with a smaller profile and with reduced costs as the needs for preventing strain from construction and additional materials are significantly diminished.

FIG. 1 is a block diagram illustrating an example of accelerometer system 20, in accordance with the techniques described herein. In the example of FIG. 1, accelerometer system 20 includes accelerometer 1 and processor 18. In the example of FIG. 1, accelerometer 1 includes proof mass 2, tines 4A-4D (collectively "tines 4"), flexure 6, strain-monitoring devices 8A and 8B (collectively "strain-monitoring devices 8"), support base 10, tether 12, electrodes 14A and 14B, and resonators 16A and 16B, and connection 38A and 38B. Accelerometer 1 is illustrated in FIG. 1 as a vibrating beam accelerometer (VBA) for illustration purposes only, and it is contemplated that strain-monitoring devices 8 may be used with any accelerometer device, including, but not limited to, a silicon oscillating accelerometer or any other device capable of measuring acceleration. In some examples, accelerometer 1 could be a micro-electromechanical systems (MEMS) accelerometer.

Proof mass 2 is configured to displace in response to an acceleration of accelerometer 1. In some examples, proof mass 2 may move about the plane as defined by support base 10 due to the acceleration of accelerometer 1. In some examples, proof mass 2 is made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, proof mass 2 is made of silicon. In some examples, proof mass 2 may move only in the plane as defined by support based 10 due to optional tether 12.

Tines 4 enable the detection of the amount of force e.g., increase or decrease of force) in accelerometer 1 by the change in their resonant frequency due to change in force on tines 4, In some examples, tines 4 are made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, tines 4 are made of a silicon material. In some examples, tines 4 may be part of resonators 16A and 16B. For instance, tines 4 may be part of a double-ended tuning fork (DETF). In some examples, tines 4 may maintain vibration at a resonant frequency when placed in an electric field generated by a respective oscillator circuit. In this example, tines 4 vibrating at a resonant frequency may also have a change in frequency when a force (e.g., compression or tension) is placed on tines 4. In some examples, tines 4 are surrounded by a plurality of electrodes. For example, the plurality of electrodes may be adjacent to and/or underneath tines 4. In these examples, tines 4 may vibrate at their resonant frequency supported by an electric field provided by the plurality of electrodes in combination with respective oscillator circuits. In these examples, the respective oscillator circuits may be constructed such that resonators 16A and 16B may be a frequency determining element. As the frequency of each resonator 16A and 16B changes due to acceleration applied to the proof mass, the respective oscillator circuits in combination with the plurality of electrodes track the change as signal (e.g., a respective tine position pickoff signal), which may be amplified by the respective oscillator circuit to generate a respective resonator driver signal. The respective oscillator circuit maintains the resonance by supplying resonator 16A and 16B with a respective resonator drive signal in phase with the tine oscillations.

Flexure 6 flexibly connects proof mass 2 to support base 10. In some examples, flexure 6 may support proof mass 2 within support base 10. In some examples, flexure 6 is made of a piezoelectric material, such as quartz (SiO2), Berlinite (AlPO4), orthophosphate (GaPO4), thermaline, barium titanate (BaTiO3), or lead zirconate titanate (PZT), zinc oxide (ZnO), or aluminum nitride (AlN), etc. In other examples, flexure 6 is made of silicon. In some examples, flexure 6 may enable proof mass 2 to pivot about flexure 6 out of the plane defined by support base 10 due to acceleration of accelerometer 1.

Strain-monitoring devices 8 detect the strain (e.g., increase or decrease in strain) of the material of accelerometer 1 (e.g., the strain of support base 10). In some examples, strain-monitoring devices 8 is made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, strain-monitoring devices 8 may be made of silicon. In some examples, strain-monitoring devices 8 may be piezoresistive, a crystalline quartz DETF, or of silicon construction.

In some examples, strain-monitoring devices 8 may be a (DETF), similar to the resonators 16A and 16B. In some examples, strain-monitoring devices 8 may be a metallized film, where a change in the resistance of strain-monitoring devices 8 will be indicative of the strain on accelerometer 1. In some examples, strain-monitoring devices 8 may have one or more cantilevers at each end to allow for adjustment of the sensitivity of strain-monitoring devices 8, on that the frequency change of strain-monitoring devices 8 is a function of applied strain to be adjusted. In some examples, strain-monitoring devices 8 may have one or more springs at one or more ends to allow for adjustment of the sensitivity of strain-tnonitoring devices 8, so that the frequency change of strain-monitoring devices 8 is a function of applied strain to be adjusted. In some examples, strain-monitoring devices 8 may be located in the same plane (e.g., in-plane) as defined by support base 10. In some examples, strain-monitoring devices 8 may be located in the same plane as tines 4, flexure 6, tether 12, and resonators 16A and 16B. In some examples, strain-monitoring devices 8 may include a plurality of electrodes connected to respective oscillator circuits.

Support base 10 provides support to proof mass 2 through flexure 6, resonators 16A and 16B, and tether 12, and may contain strains which may also displace proof mass 2. In some examples, support base 10 is made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, support base 10 is made of silicon. In some examples, support base 10 may define a plane in which proof mass 2, tines 4, flexure 6, strain-monitoring devices 8, tether 12, and acceleration devices 16A and 16B are also located in the same plane. In some examples, support base 10 is a piece of monolithic material with a plurality of features etched to form a top layer of accelerometer 1. In some examples, support base 10 consists essentially of either quartz or silicon.

Tether 12, which is optional, attaches proof mass 2 to support base 10 and may restrict motion of proof mass 2, while still allowing proof mass 2 to pivot about the axis created by flexure 6 and tether 12. In some examples, tether 12 is made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, tether 12 is made of silicon. In some examples, tether 12 is flexible about the plane defined by support base 10, but stiff in the direction in and out of the plane defined by support base 10.

Resonators 16A and 16B may be double-ended tuning forks (DETFs) with tines 4, which may detect the rotation of proof mass 2. Resonators 16A and 16B may also include electrodes 14A and 14B, which may partially surround a portion of tines 4. For example, electrodes 14A and 14B may be adjacent to or applied on tines 4. Each of resonators 16A and 16B may be connected to a respective oscillator circuit by electrodes 14A and 14B to sustain the resonance of tines 4.

Each of electrodes 14A and 14B includes a plurality of electrodes that drive tines 4 to maintain resonance of tines 4 and to detect the position of tines 4. Electrodes 14A and 14B, in combination with the respective oscillator circuit, provide a patterned electric field to cause tines 4 to maintain resonance of tines 4. Electrodes 14A and 14B adjacent to the corresponding tines 4 may detect the position of the corresponding tines 4 as a respective tine position pickoff signal. Electrodes 14A and 14B may be configured to detect the position of the corresponding tines 4 using capacitive, electromagnetic, or optical means. In some examples, the frequency associated with the respective tine position pickoff signal detected by electrodes 14A and 14B may be indicative of the resonant frequency of tines 4. Electrodes 14A and 14B may also provide the detected respective tine position pickoff signal to the respective oscillator circuit which amplifies the respective tine position pickoff to create a respective resonator drive signal. The respective oscillator circuits may provide the respective resonator drive signals to electrodes 14A and 14B to maintain resonance (e.g., in-plane and out-of-phase) of tines 4. The oscillator circuits may independently amplify the respective tine position pickoff signals, and provide the respective tine position pickoff signals as outputs to a processor. In this manner, electrodes 14A and 14B may detect the rotation of proof mass 2 by detecting the respective tine position pickoff signals, each respective tine position pickoff signal having a frequency indicative of a change in the resonant frequency of tines 4.

Electrodes 14A and 14B may include structures located on tines 4 or a base layer (not shown). For instance, electrodes 14A and 14B may include a plurality of electrodes that are vapor deposited on the base layer that surrounds tines 4 or may be applied by direct fusion bonding the base layer to support base 8. In some examples, electrodes 14A and 14B of a base layer may be applied by using braze materials, epoxies, or adhesives to bond the base layer to support base 8. In some examples, electrodes 14A and 14B may have charges from an attached electronics (e.g., an oscillator circuit, or the like) via wire bonding, and metallization patterns may be applied electrodes 14A and 14B through vacuum deposition.

The respective oscillator circuits may be part of accelerometer 1 and are constructed such that resonators 16A and 16B are the frequency determining elements. As the frequency of each resonator 16A and 16B changes due to acceleration applied to proof mass 2, the respective oscillator circuits track the change in each resonator 16A and 16B. Each respective oscillator circuit maintains the resonance of resonators 16A and 16B by supplying resonators 16A and 16B with appropriate energy, in phase with the tine 4 oscillations. For example, the respective oscillator circuits may maintain the resonance of tines 4 by using a detected instantaneous DETF tine position from electrodes 14A and 14B, e.g., respective tine position pickoff signals, and subsequently amplifying the respective tine position pickoff signals to create respective resonator drive signals, which are then applied to the corresponding resonators 16A and 16B using electrodes 14A and 14B. The frequency of resonators 16A and 16B may be a function of the load applied across tines 4 (e.g., by the movement of proof mass 2). In this manner, where the respective resonator drive signal is in phase with the respective tine position pickoff signal, the respective resonator drive signal satisfies the Barkhausen stability criterion.

Connection 38A and 38B are connection areas (e.g., zones of strain due to mounting connections) between accelerometer 1 and a housing (not shown). In some examples, connection 38A and 38B may be isolation elements that isolate accelerometer 1 from the housing. In some examples, connection 38A and 38B may be any location on support base 10 where strains increase or decrease. In some examples, connection 38A and 38B are where the changes in the strain of the accelerometer will have the greatest effect. In some examples, moving strain-monitoring devices 8 closer to or away from connection 38A and 38B would increase and decrease, respectively, the sensitivity of strain-monitoring devices 8.

Processor 18 as well as other processors disclosed herein can each comprise any suitable arrangement of hardware, software, firmware, or any combination thereof, to perform the techniques attributed to the respective processor 18 herein. For example, processor 18 may each include any one or more microprocessors, digital signal processors (DSPs), application specific integrated circuits (ASICs), field programmable gate arrays (FPGAs), or any other equivalent integrated or discrete logic circuitry, as well as any combinations of such components.

Processor 18 receives data from accelerometer 1. In some examples, processor 18 may receive data from accelerometer 1 indicative of an amount of strain on accelerometer 1. In some examples, processor 18 may receive data from accelerometer 1 indicative of an amount of acceleration of accelerometer 1. In these examples, processor 18 may use the data from accelerometer 1 to determine a modified acceleration value based on the amount of strain on accelerometer 1 and the amount of acceleration of accelerometer 1.

In the example of FIG. 1, resonators 16A and 16B are connected between proof mass 2 and support base 10 and strain-monitoring devices 8 is located adjacent to resonators 16A and 16B, and flexure 6. In some examples, the distance of strain-monitoring devices 8 should be close enough to detect the change in strain applied to the resonators 16A and 16B, but not so close as to deleteriously affect the functioning of the accelerometer. For example, a distance equal to ten thousandths of an inch or greater should be adequate to prevent the electric field energizing the strain compensator from interfering with the lead(s) returning the acceleration signal to processor 18. Although not shown in FIG. 1, in some examples, a housing structure may surround accelerometer 1 and may be attached to support base 10.

Strain-monitoring devices 8 may monitor the strain on accelerometer 1 by, for example, monitoring the strain-induced change in the frequency of the DETF. In some examples, the strain-induced change in frequency of strain-monitoring devices 8 may be incorporated into a performance model algorithm used to determine the measured acceleration of the accelerometer. By introducing the strain-induced change in frequency of strain-monitoring devices 8 into the performance algorithm, the performance may gain an additional degree of freedom, such that another dimension (e.g., an independent parameter) of the accelerometer is known, enabling the performance algorithm to reduce or eliminate degradation of the acceleration measurements due to the effects of strain on accelerometer 1. In other words, by incorporating the change in frequency of the strain-monitoring devices 8 into the performance algorithm that determines the acceleration detected by accelerometer 1, the performance algorithm has one less unknown variable. In some examples, direct measurement of the strain measurement of the strain change can be made with no isolation mechanisms surrounding the strain-monitoring devices 8. In instances where it is desired to reduce the amplitude of the strain-monitoring signal, strain-monitoring devices 8 may be isolated to an adjustable degree by use of one or more flexible cantilevers and/or springs. In other examples where it is desired to reduce the amplitude of the strain-monitoring signal, strain-monitoring devices 8 may be isolated from thermal effects by a zero gauge length configuration (e.g., where the length of strain-monitoring devices 8 negates any thermal effects).

In some examples, the orientation (e.g., the direction) of strain-monitoring devices 8 may be based on where the strains are most likely to occur on accelerometer 1. In the example of FIG. 1, a first strain-monitoring device 8A may be within a threshold number of degrees of perpendicular (e.g., between 75° and 105°, within plus or minus 15 degrees of perpendicular, etc.) to DETFs 16A and 16B, and DETFs 16A and 16B may be within a threshold number of degrees of parallel (e.g., between 165° and 195°, within plus or minus 15 degrees of parallel, etc.) to each other. In some examples, the most sensitive direction of strain-monitoring devices 8 may be exactly perpendicular to the applied strain. For example, to the extent to which this angle changes, the sensitivity will be reduced by the cosine of the angle, which may allow for further adjustment of the sensitivity. In some examples, a second strain-monitoring device 8B may be within a threshold number of degrees of parallel (e.g., between 165° and 195', within plus or minus 15 degrees of parallel, etc.) to DETFs 16A and 16B. In some examples, placement and direction of the sensitive axis of strain-monitoring devices 8 may depend on how and where the accelerometer is attached to a support mechanism and how resultant strains propagate through accelerometer 1. In some examples, based on the manner of attaching accelerometer 1 to the housing, a strain pattern can be used to orient strain-monitoring devices 8.

Accelerometer 1 may be configured in accordance with techniques of this disclosure to provide for a better performance model algorithm, which may enable processor 18 to better compensate for the strains placed on the accelerometer. In general, accelerometer 1 includes mounting strains, expansion coefficients, and epoxies, which may change their state over time. However, as the states of the mounting strains, expansion coefficients, and epoxies may change, the strain of accelerometer 1 may also change, which may offset the original model of the accelerometer. By providing one or more strain-monitoring devices, such as strain-monitoring devices 8, there may be a reduction in the amount of accelerometer calibrations. Moreover, strain-monitoring devices 8 may detect the strains in the material of accelerometer 1, which may also provide a more accurate determination of the actual strain instead of minimizing the effect of thermal strains.

In the example of FIG. 1, accelerometer 1 may be accelerated, which may cause proof mass 2 to be displaced enabling accelerometer 1 to measure the acceleration. Once proof mass 2 is displaced, resonator 16A and 16B are also displaced (e.g., as proof mass 2 pushes down to the left, resonator 16A has compression and resonator 16B has tension), which generates forces on tines 4 of each resonator 16A and 16B. Metallized surfaces surround tines 4 of each resonator 16A and 16B and are used as electrodes 14A and 14B. Electrodes 14A and 14B in combination with respective oscillator circuits may provide electric fields and/or charges and detect the position of tines 4 as respective signals.

In the example of FIG. 1, accelerometer 1 may also have forces at connection 38A and 38B, which may cause proof mass 2 to be displaced, and cause accelerometer 1 to detect and indicate a false acceleration of accelerometer 1. The forces at connection 38A and 38B may also degrade the performance of accelerometer 1, such that accelerometer 1 does not provide accurate acceleration measurements. In some examples, accelerometer 1 may have strain relief from strains anywhere in its structure created during construction, which may cause proof mass 2 to be displaced, and cause accelerometer 1 to detect a false acceleration. The strain relief may also degrade the performance of accelerometer 1, such that accelerometer 1 does not provide accurate acceleration measurements.

In general, as strains are created or relieved at connections 38A and/or 38B the corresponding strains on tines 4 may be created or relieved, and the resonant frequency of tines 4 may change, and the change may be indicative of the strain on accelerometer 1. As strains are created or relieved anywhere in accelerometer 1, the strains on tines 4 may also be created or relieved, and the resonant frequency of tines 4 may change, such that the change may be indicative of the strain on accelerometer 1. In other examples, the resonant frequency of tines 4 may not change, which may be an indication of the strain on accelerometer 1.

To reduce or eliminate the performance degradation of accelerometer 1, at least one strain-monitoring devices 8, such as a DETF (e.g., DETF 28 as described in FIG. 3) or a resistive film (e.g., strain-monitoring devices 80B as described in FIG. 4) may be used to detect and indicate the strain (e.g., the increase or decrease of strain) of accelerometer 1. For example, as forces are created or relieved at connections 38A and/or 38B, corresponding strains on tines 4 of the DETF are also created or relieved. Metallized surfaces of electrodes 14A and 14B surround tines 4 of the DETF and are used as electrodes (e.g., drive and pickoff electrodes) to provide patterned electric fields to support tines 4 in vibrating at their resonant frequency, and detect the position of tines 4 as a signal. In some examples, electrodes 14A and 14B may be underneath tines 4. The indications of the strain from strain-monitoring devices 8 (e.g., respective tine position pickoff signals) may be used in combination with the indications of acceleration from resonators 16A and 16B (e.g., respective tine position pickoff signals) to compensate for strain or strain relief in the acceleration measurement of accelerometer 1. In some examples, processor 18 may receive the indications of the strain or strain relief from strain-monitoring devices 8 through a signal provided by electrodes (e.g., the electrodes may be similar to electrodes 14A and 14B) in combination with a respective oscillator circuit. In some examples, processor 18 may use a performance algorithm to determine an adjusted or modified acceleration measurement, such that one degree of freedom (e.g., an independent parameter) is the combined indications of the strain of accelerometer 1, and another degree of freedom is the combined indications of acceleration of accelerometer 1.

Figure 2:
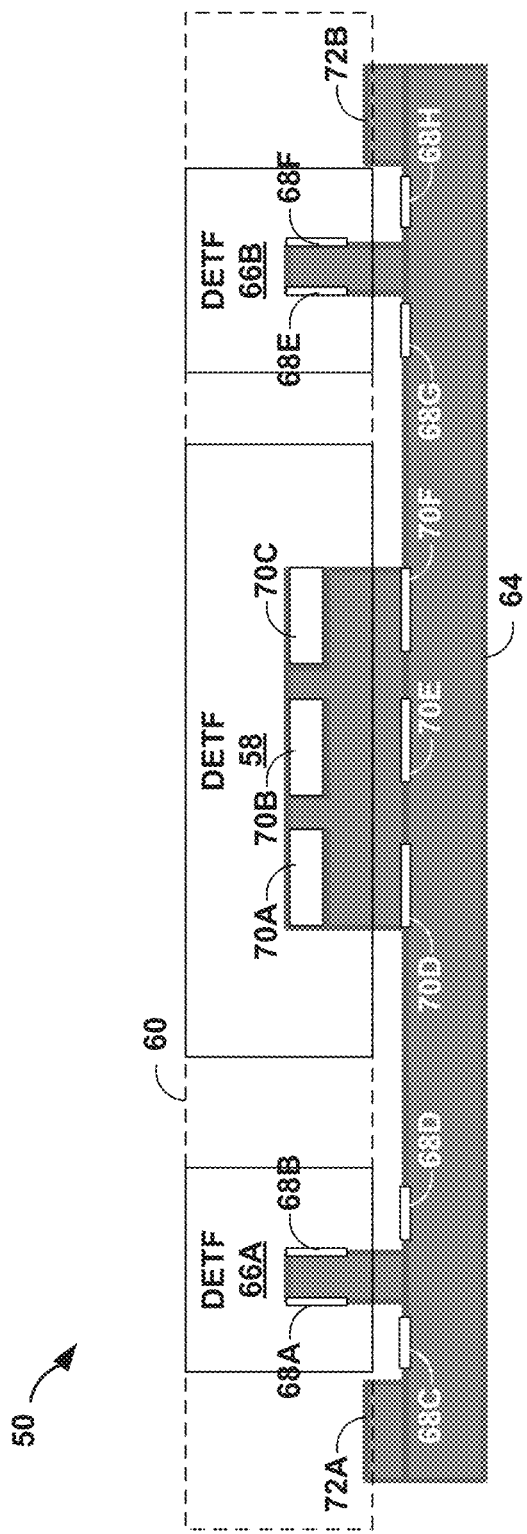
FIG. 2 is a block diagram illustrating a side view of the accelerometer that includes one or more electrodes on the base layer surrounding one or more tines of the DETFs located on the support base, in accordance with the techniques described herein.

FIG. 2 is a block diagram illustrating an example side view of accelerometer 50 that includes one or more electrodes on base layer 64 surrounding one or more tines of the DETFs located on support base 60, in accordance with the techniques described herein. In the example of FIG. 2, accelerometer 50 includes three double-ended tuning forks (DETFs) 58, 66A, and 66B which may correspond to strain-monitoring devices 8, and resonators 16A and 16B, respectively, as described in FIG. 1. In the example of FIG. 2, accelerometer 50 also includes support base 60, which may correspond to support base 10, as described in FIG. 1, base layer 64, acceleration electrodes 68, strain electrodes 70, and mesas 72A and 72B. Although not shown in FIG. 2, in some examples, a housing structure may surround accelerometer 50 and may be attached to support base 60 and/or base layer 64 at connections, such as connection 38A and 38B as described in FIG. 1.

Base layer 64 may provide support to support base 60 of accelerometer 50 with mesas 72A and 72B. In some examples, base layer 64 is made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, base layer 64 is made of silicon. In some examples, base layer 64 may be constructed separately from support base 60. In some examples, base layer 64 may be attached to support base 60 by brazing or other attachment techniques, such as fusion bonding.

Acceleration electrodes 68 represent the metallization surfaces of base layer 64 to form electrodes located underneath and adjacent to the tines of DETFs 66A and 66B. In some examples, acceleration electrodes 68 may be metallized in vacuum evaporator with shadow mask on to base layer 64. In some examples, acceleration electrodes may be made of a conductive metal, such as gold. In some examples, the acceleration electrodes 68 (e.g., acceleration electrodes 68A, 68B, 68C, 68D, 68E, 68F, 68G, and 68H) in combination with respective oscillator circuits may provide a patterned electric field to cause the tines of DETF 66 to vibrate at a resonant frequency (e.g., in plane and out-of-phase). In some examples, acceleration electrodes 68 (e.g., acceleration electrodes 68A, 68B, 68C, 68D, 68E, and 68F) may detect a signal indicative of the tines of DETFs 66A and 66B, and a frequency of the signal may be indicative of the resonant frequency of the tines. In this manner, acceleration electrodes 68 in combination with respective oscillator circuits may be configured to drive the tines of DETFs 66A and 68B and detect changes in the resonant frequency of the tines caused by forces received from displacement of the proof mass. In some examples, acceleration electrodes 68 may correspond to electrodes 14A and 14B as described in FIG. 1.

Strain electrodes 70 represent the metallization surfaces of base layer 64 to form electrodes located underneath and adjacent to the tines of DETF 58. In some examples, strain electrodes 70 may be metallized in a vacuum evaporator with shadow mask on to base layer 64. In some examples, strain electrodes 70 may be made of gold. In some examples, strain electrodes 70 (e.g., strain electrodes 70A-70F) in combination with an oscillator circuit may provide an electric field to vibrate the tines of DETF 58 at a resonant frequency (e.g., in plane and out-of-phase). In some examples, strain electrodes 70 (e.g., strain electrodes 70A-70F) may detect a signal indicative of the tines of DETF 58, and a frequency of the signal may be indicative of the resonant frequency of the tines. In this manner, strain electrodes 70 in combination with an oscillator circuit may be configured to drive the tines of DETF 58 and detect changes in the resonant frequency of the tines caused by strains received from strain creation or relief in accelerometer 1. In some examples, acceleration electrodes 68 may correspond to electrodes 14A and 14B as described in FIG. 1.

Mesas 72A and 72B represent the distance necessary between the tines of DETFs 58, 66A and 66B, and acceleration electrodes 68 and strain electrodes 70 respectively, so the tines of DETFs 58, 66A, and 66B may vibrate freely, while still maintaining the electric field from acceleration electrodes 68 and strain electrodes 70. In one example, mesas 72A and 72B separate the tines from their respective electrodes by a distance of two to five thousandths of an inch. In another example, mesas 72A and 72B may have a height equal to the thickness of the tines.

Figure 3:
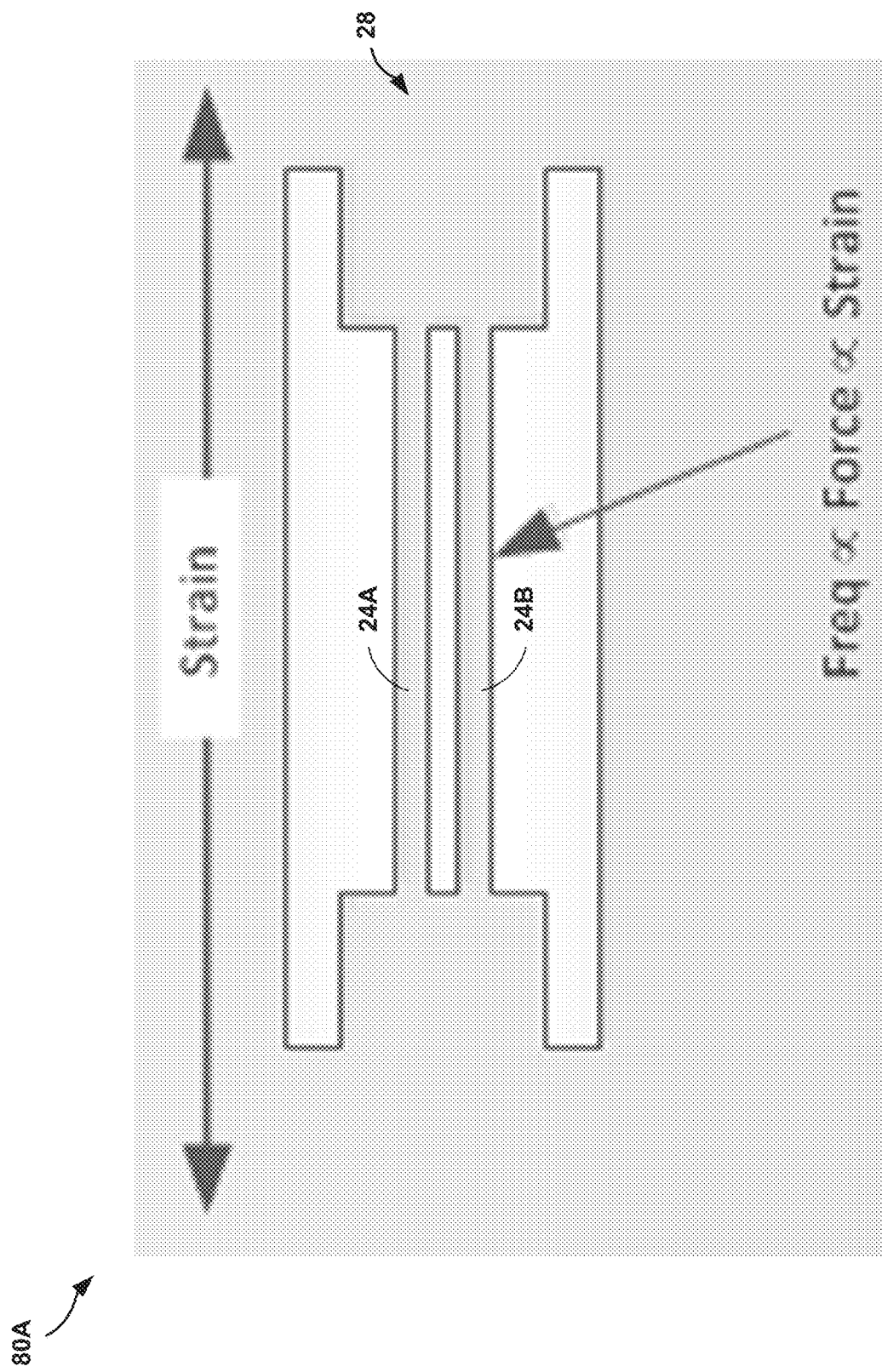

FIGS. 3-6 are conceptual diagrams illustrating examples of strain-monitoring devices 80A-80D, in accordance with the techniques described herein. FIG. 3 is described within the context of FIG. 1. In the example of FIG. 3, strain-monitoring devices 80A includes double-ended tuning fork (DETF) 28 with tines 24A and 24B (collectively "tines 24"), which may correspond to tines 4 as described in FIG. 1, and may detect the strain (e.g., the increase or decrease of strain) of accelerometer 1. In some examples, DETF 28 may correspond to strain-monitoring devices 8 as described in FIG. 1, and is made of a piezoelectric material, such as quartz (SiO2), Berlinite (AlPO4), gallium orthophosphate (GaPO4), thermaline, barium titanate (BaTiO3), or lead zirconate titanate (PZT), zinc oxide (ZnO), or aluminum nitride (AlN), etc. In other examples, DETF 28 is made of silicon. In some examples, DETF 28 may be piezoresistive, a crystalline quartz DETF, or of silicon construction. In some examples, DETF 28 may detect the strain of support base 10. In some examples, DETF 28 may be similar to resonator(s) 16A and 16B as described in FIG. 1. In some examples, DETF 28 in combination with strain electrodes 70 and a respective oscillator circuit may provide a digital output to processor 18 as described in FIG. 1.

In some examples, the orientation (e.g., the direction) of DETF 28 may be based on where the strains are most likely to occur. In some examples, DETF 28A may be within a threshold number of degrees of perpendicular (e.g., between 75° and 105°, within plus or minus 15 degrees of perpendicular, etc.) to DETFs 16A and 16B, and DETFs 16A and 16B may be within a threshold number of degrees of parallel (e.g., between 165° and 195°, within plus or minus 15 degrees of parallel, etc.) to each other. In some examples, DETF 28B may be within a threshold number of degrees of parallel (e.g., between 165° and 195°, within plus or minus 15 degrees of parallel, etc.) to DETFs 16A and 16B. In some examples, based on the manner of attaching accelerometer 1 to the housing, a strain pattern can be used to orient DETF 28. DETF 28 may also have a strain state, such as state zero, where DETF 28 vibrates at a first frequency. For example, if tension (e.g., an increase in the strain on accelerometer 1) is applied to DETF 28 the frequency increases from the first frequency. Conversely, if compression (e.g., a decrease in the strain on accelerometer 1) is applied to DETF 28 the frequency decreases from the first frequency.

The island between tines 24 contains electrodes that detect as a signal the position of tines 24, such that the any changes in the electric field are an indication of a change of strain on tines 24. The electrodes may correspond to electrodes 14A and 14B as described in FIG. 1 and are supported by a piezoelectric material, such as quartz ($SiO_2$), Berlinite ($AlPO_4$), gallium orthophosphate ($GaPO_4$), thermaline, barium titanate ($BaTiO_3$), or lead zirconate titanate (PZT), zinc oxide (ZnO), or aluminum nitride (AlN), etc. In some examples, the islands may have metallization on their surfaces forming a plurality of electrode surfaces (e.g., electrodes). In some examples, the electrodes may be located adjacent to tines 24, such as a distance of two to five thousandths of an inch, which may enable tines 24 to vibrate freely white in combination with an oscillator circuit may provide an the electric field to cause tines 24 to vibrate at their resonant frequency. In some examples, the electrodes underneath tines 24 in combination with an oscillator circuit may provide a patterned electric field to cause tines 24 to vibrate at their resonant frequency. In other examples, the electrodes underneath tines 24 may detect the position of tines 24 as a signal in order to detect the resonant frequency of tines 24, and provide the detected signal to the oscillator circuit. In these examples, the oscillator circuit may amplify the detected signal, and provide the amplified signal to the electrodes in order to maintain resonance of tines 24 in-plane and out-of-phase. In these examples, the oscillator circuit may also independently amplify the detected signal and provide the amplified signal to processor 18 as described in FIG. 1.

Figure 4:
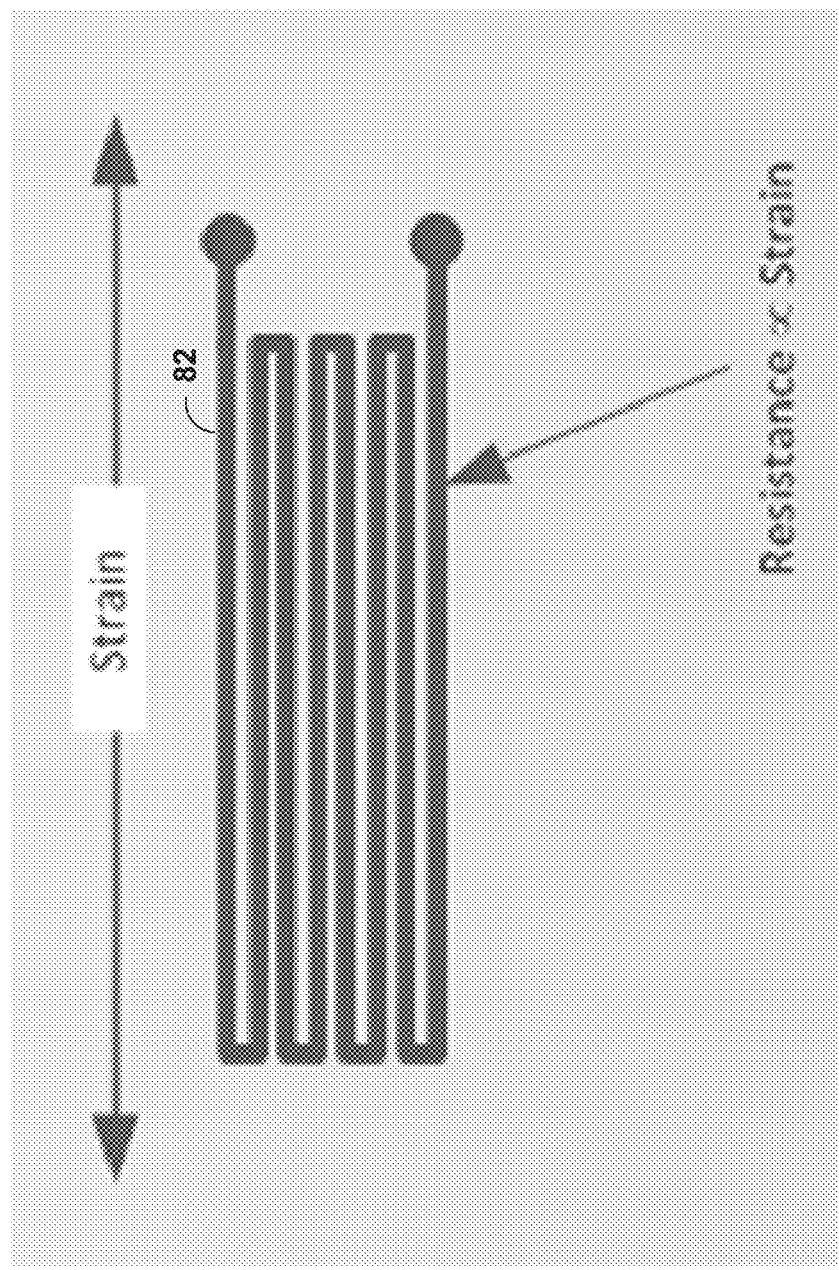

In the example of FIG. 4, strain-monitoring devices 80B may include strips of resistive film 82. In the example of FIG. 4, resistive film 82 may be metallized film strips deposited (e.g., deposited by vacuum deposition) on the surface of accelerometer 1. In the example of FIG. 4, the strain detected by strain-monitoring devices 80B is proportional to the resistance of strain-monitoring devices 80B. In some examples, one or more strain-monitoring devices 80A may be used anywhere on the accelerometer where strains need to be detected. For example, two strain-monitoring devices 80B may be used, where one strain-monitoring devices 80B may be positioned along the x-axis, and the other strain-monitoring devices 80A may be positioned along the y-axis of accelerometer 1 to detect strains in the x and y directions of accelerometer 1.

In the example of FIGS. 5A-5B, strain-monitoring devices 80C may include a double-ended tuning fork (DETF) 86 with spring 84 to reduce strain sensitivity. In some examples, strain measurement methods, particularly the use of a DETF (e.g., DETF 28 as described in FIG. 4) to measure strain is too sensitive (e.g., strains on the accelerometer may be significantly greater than forces on the proof mass) to use when mounted directly to the accelerometer. DETF 86 may correspond to DETF 28 as described in FIG. 4. Spring 84 is a beam of material (e.g., quartz or silicon) that partially isolates DETF 86 from the accelerometer. In some examples, spring 84 may be located at one end of strain-monitoring devices 80C to allow the adjustment of strain sensitivity and provide a dampened output indicating the amount of strain on the accelerometer.

In the example of FIG. 5A. DETF 86 and spring 84 are under no strain. In the example of FIG. 5B, both DETF 86 and spring 84 are under strain, and spring 84 is flexed to dampen the strain on DETF 86, which reduces the sensitivity of DETF 86. In some examples, one or more strain-monitoring devices 80C may be used anywhere on the accelerometer where strains need to be detected. For example, two strain-monitoring devices 80C may be used, where one strain-monitoring devices 80C may be positioned along the x-axis, and the other strain-monitoring devices 80C may be positioned along the y-axis of accelerometer 1 to detect strains in the x and y directions of accelerometer 1.

Figure 6:
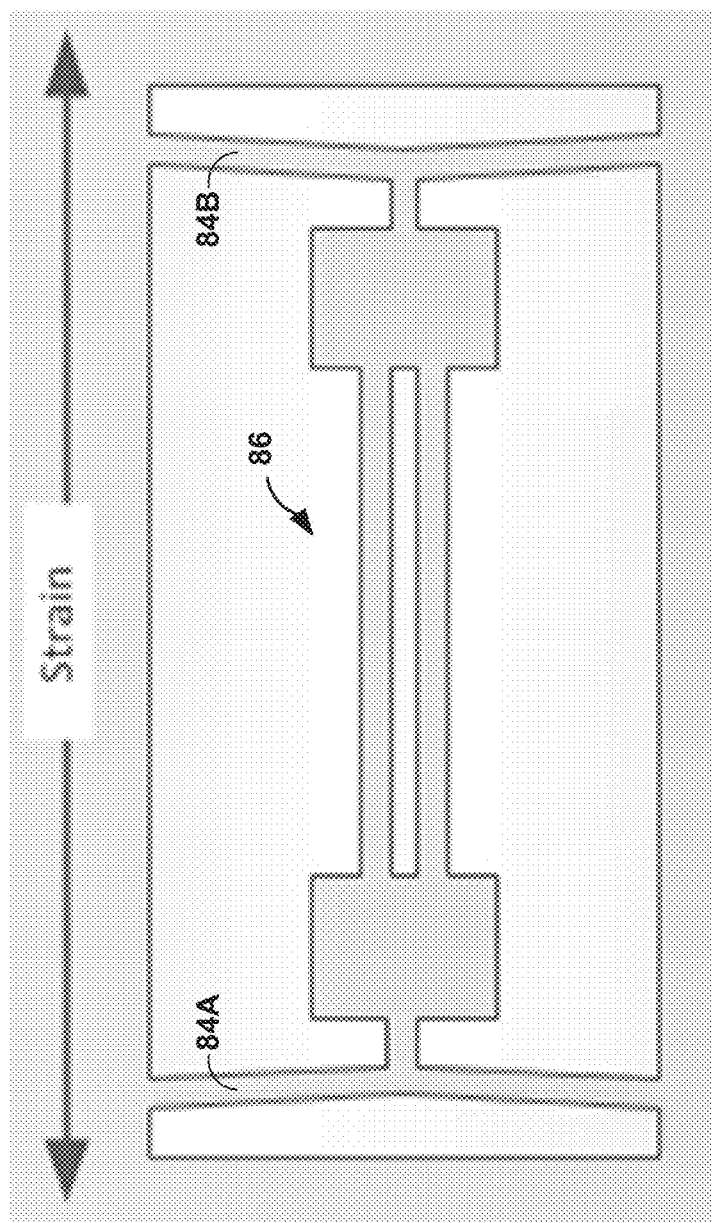

In the example of FIG. 6, strain-monitoring devices 80D may include a double-ended tuning fork (DETF) 86 with springs 84A and 84B for increased reduction in strain sensitivity. In some examples, strain measurement methods, particularly the use of a DETF (e.g., DETF 28 as described in FIG. 4) to measure strain is too sensitive (e.g., strains on the accelerometer may be significantly greater than forces on the proof mass) to use when mounted directly to the accelerometer. DETF 86 may correspond to DETF 28 as described in FIG. 4. Springs 84A and 84B may correspond to spring 84 as described in FIGS. 5A-5B. In the example of FIG. 6, springs 84A and 84B may reduce the sensitivity of DETF 86 by further dampening the output of DETF 86 indicative of the amount of strain on the accelerometer. In the example of FIG. 6, springs 84A and 84B may allow for a tunable strain response, and cancellation of the inertial effects from the mass of springs 84A and 84B. In some examples, one or more strain-monitoring devices 80D may be used. For example, two strain-monitoring devices 80D may be used, where one strain-monitoring device 80D may be positioned along the x-axis, and the other strain-monitoring device 80D may be positioned along the y-axis of accelerometer 1 to detect strains in the x and y directions of accelerometer 1.

Figure 7A:
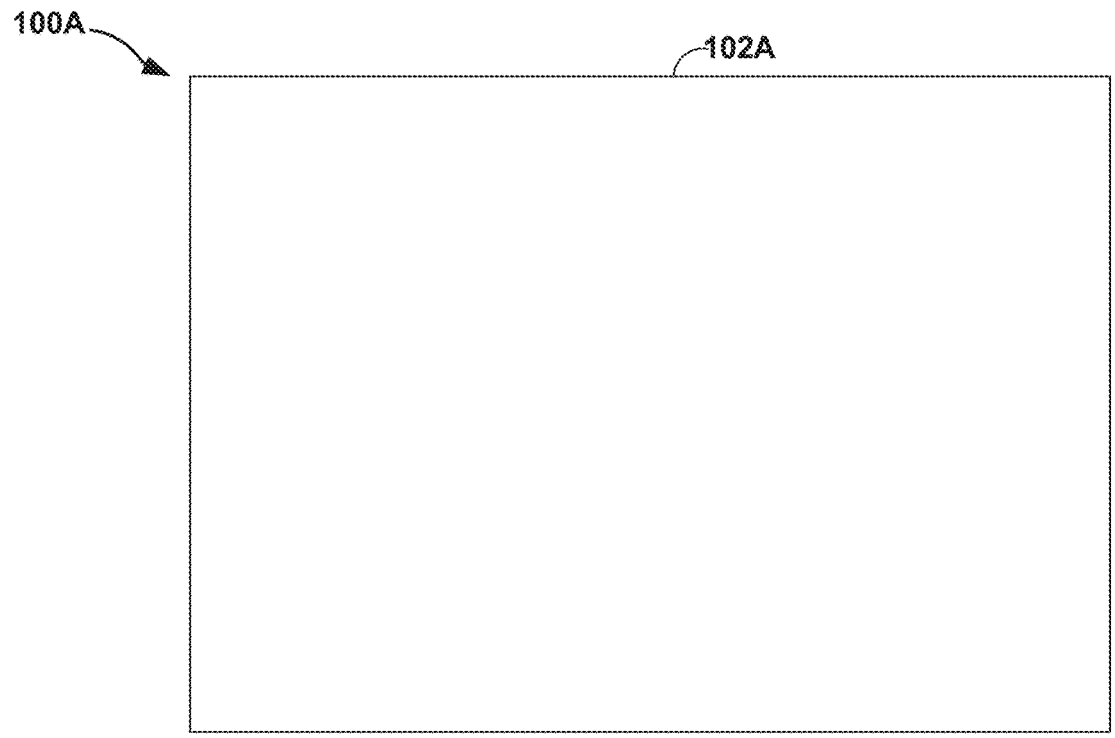
FIGS. 7A-7C are block diagrams illustrating an example formation of an accelerometer that includes a strain-monitoring device, in accordance with the techniques described herein.
Figure 7B:
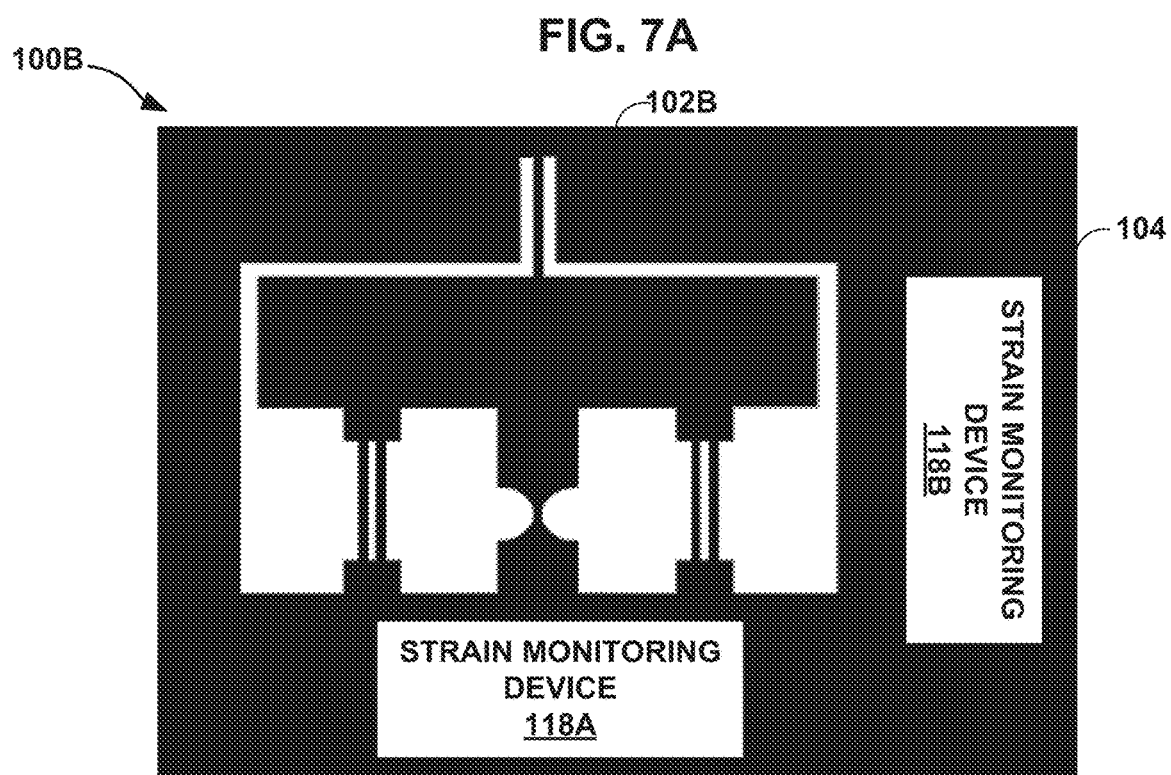
Figure 7C:
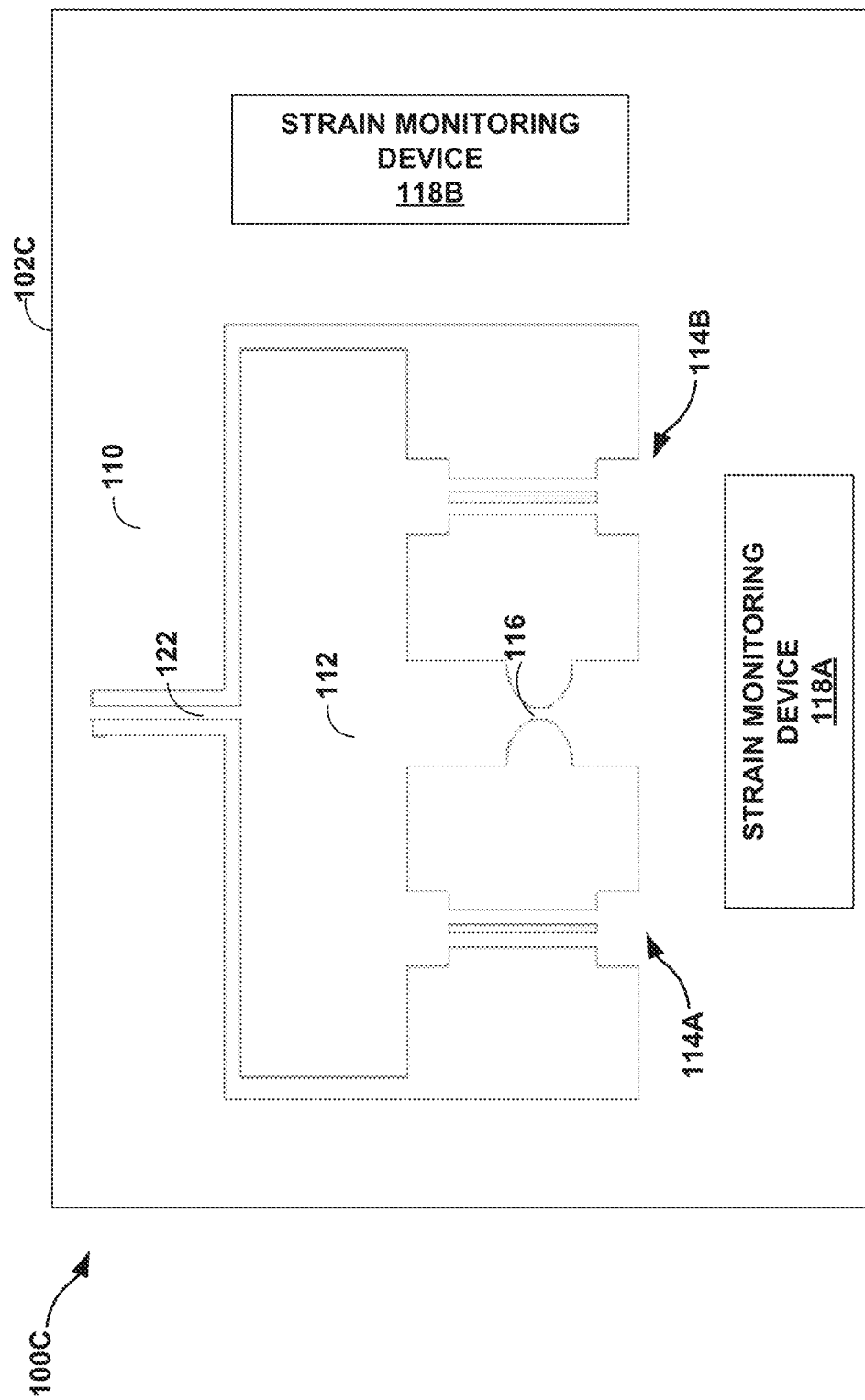

FIGS. 7A-7C are block diagrams illustrating an example formation of an accelerometer that includes a strain-monitoring device, in accordance with the techniques described herein. In the example of FIG. 7A, accelerometer 100A is substrate 102A. In some examples, substrate 102A may be composed of either crystalline quartz or silicon.

In the example of FIG. 7B, accelerometer 100B is substrate 102B with masking of photoresist 104, which is masked to define a plurality of features on substrate 102B. In some examples, substrate 102B with masking of photoresist 104 is exposed to light and/or acid to remove (e.g., etch) material from substrate 102B to form a plurality of features. In some examples, one feature of the plurality of features etched into substrate 102B is one or more strain-monitoring devices 118A and 118B (collectively "strain-monitoring devices 118"). In other examples, strain-monitoring devices 118 may be a resistive film, such as resistive film 82 as described in FIG. 4.

In the example of FIG. 7C, accelerometer 100C is etched substrate 102C. In some examples, the etchings of etched substrate 102C may define a plurality of features, which may include support base 110, proof mass 112, acceleration double-ended tuning forks (DETFs) 114A and 114B, flexure 116, strain-monitoring devices 118, and optional tether 122, which may correspond to support base 10, proof mass 2, resonators 16A and 16B, flexure 6, strain-monitoring devices 8, and optional tether 12, as described in FIG. 1. In some examples, strain-monitoring devices 118 may be a DETF etched as one of the plurality of features. In some examples, strain-monitoring devices 118 may be a resistive film, which is a metallized film that is vacuum deposited on etched substrate 102C.

Figure 8:
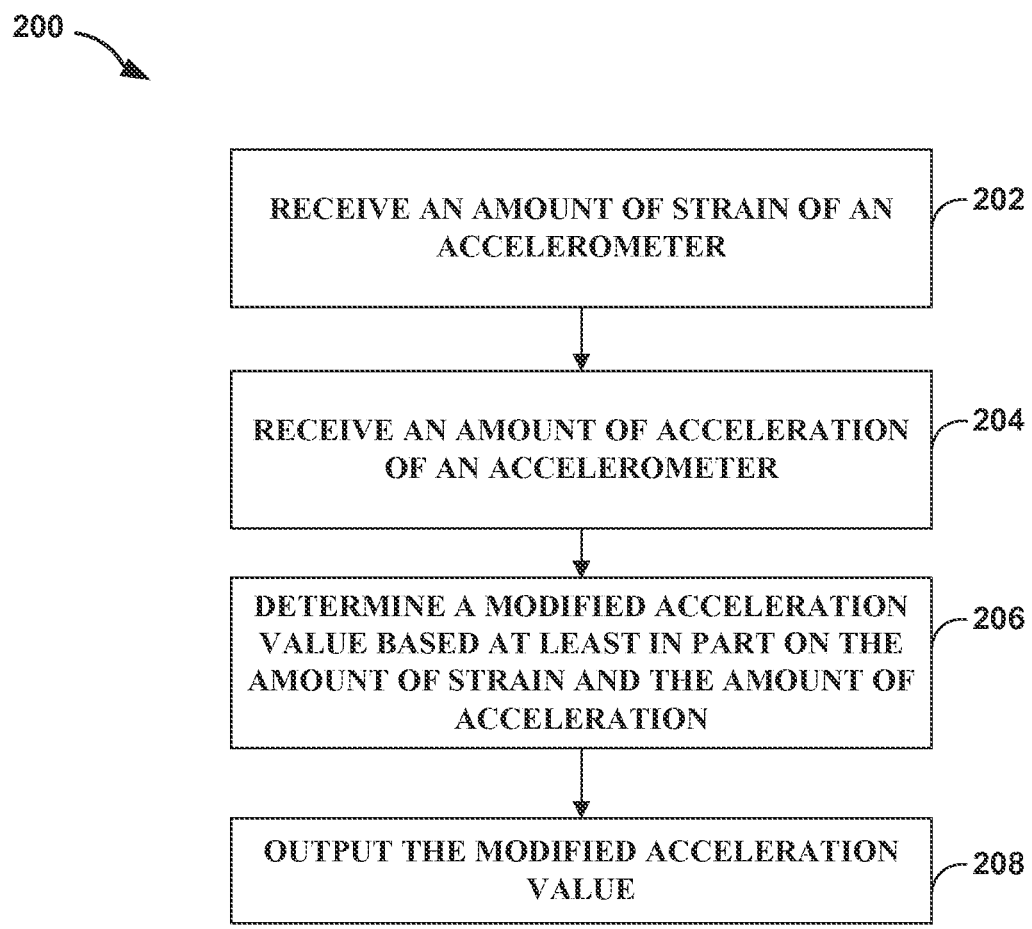
FIG. 8 is a flow chart illustrating an example process of using an accelerometer that includes a strain-monitoring device to compensate for strain errors, in accordance with the techniques described herein.

FIG. 8 is a flow chart illustrating an example process 200 of using an accelerometer that includes a strain-monitoring device to compensate for strain errors, in accordance with the techniques described herein. FIG. 8 is described in the context of FIGS. 1 and 2.

A processor (e.g., processor 18 as described in FIG. 1) may receive an amount of strain on an accelerometer (e.g., accelerometer 1 as described in FIG. 1) (202). In some examples, the amount of strain on the accelerometer may be measured by one or more strain-monitoring devices (e.g., strain-monitoring devices 8 as described in FIG. 1) on the accelerometer. In some examples, strain-monitoring devices 8 may include a double-ended tuning fork (e.g., DETF 28 as described in FIG. 4) located in-plane with two or more resonators (e.g., resonators 16A and 16B as described in FIG. 1), and measuring the strain of the strain-monitoring device may be based on measuring the resonant frequency of the strain-monitoring device, and the resonant frequency of the strain-monitoring device increases during tension and decreases during compression of the accelerometer. In some examples, the strain-monitoring device may include a plurality of electrode surfaces (e.g., similar to electrodes 14A and 14B as described in FIG. 1) surrounding at least a portion of tines of the DETF. In some examples, strain-monitoring devices 8 may include strips of resistive film, and measuring the strain of strain-monitoring device may be based on measuring the resistance of the strips of resistive film. In some examples, strain-monitoring devices 8 may include a DETF and a spring at an end of the DETF, and the spring may reduce the strain sensitivity of the DETF. In some examples, strain-monitoring devices 8 may include strips of resistive film, and measuring the strain of strain-monitoring device may be based on measuring the resistance of the strips of resistive film.

The processor (e.g., processor 18 as described in FIG. 1) may receive an amount of acceleration of the accelerometer (e.g., accelerometer 1 as described in FIG. 1) (204). In some examples, the amount of acceleration of the accelerometer may be measured by two or more resonators (e.g., resonator 16A and 16B as described in FIG. 1) on the accelerometer. In some examples, at least one of the two or more resonators may include a double-ended tuning fork, and measuring the amount of acceleration of the accelerometer may be based on the difference in frequency between the two or more resonators. In some examples, at least one of the two or more resonators includes a plurality of electrode surfaces (e.g., electrodes 14A and 14B as described in FIG. 1) surrounding at least a portion of tines of the DETF.

The processor (e.g., processor 18 as described in FIG. 1) may determine a modified acceleration value of the accelerometer based at least in part on the amount of strain on the accelerometer and the amount of acceleration of the accelerometer (206). Processor 18 may also output the modified acceleration value (208). In some examples, the accelerometer may be comprised of a monolithic material and includes a proof mass, a support base, a flexure, and the two or more resonators. In some examples, the monolithic material may be at least one of quartz or silicon.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. These and other examples are within the scope of the following claims. the support base.

What is claimed is:

1. An accelerometer device, the device comprising:
a proof mass;
a support base configured to support the proof mass,
wherein the device defines a plane, the plane being defined by a first axis and a second axis perpendicular to the first axis, wherein the support base and the proof mass are coplanar with the plane defined by the device,
wherein the proof mass is configured to displace within the plane of the device in response to an acceleration of the device;
a hinge flexure configured to flexibly connect the proof mass to the support base and to define a third axis in and out of the plane, wherein the third axis is perpendicular to both the first axis and the second axis;
a tether attached to the proof mass opposite the hinge flexure and within the plane of the device, the tether configured to restrict the proof mass from movement in the direction of the third axis in and out of the plane while still allowing the proof mass to pivot about the third axis created by the hinge flexure;
a resonator configured to connect the proof mass to the support base, wherein:
the resonator, the proof mass, and the hinge flexure are all in a same plane, and
the proof mass is configured to rotate about the hinge flexure, wherein:
the rotation of the proof mass is relative to the support base and in the same plane as the support base, and
the rotation of the proof mass is relative to the hinge flexure;
a strain-monitoring double-ended tuning fork (DETF), separate from the resonator, that includes a plurality of tines located in the plane of the support base, wherein the strain-monitoring DETF is configured to generate an output indicative of an amount of strain on the support base by changing a resonant frequency of the plurality of tines in response to strain induced compression forces or tension forces acting on the support base; and
a spring configured to directly couple a first end of the strain-monitoring DETF to the support base, wherein the spring is configured to provide a degree of strain sensitivity and to dampen the strain from the support base.

2. The device of claim 1, further comprising a plurality of electrodes surrounding at least a portion of the strain-monitoring DETF.

3. The device of claim 1, further comprising:
a processor configured to determine, based on a displacement of the proof mass, an acceleration measurement.

4. The device of claim 3, wherein the processor is configured to adjust, based on the output indicative of the amount of strain, the acceleration measurement.

5. The device of claim 1, wherein the resonator is a first resonator, the device further comprising:
a second resonator, wherein the first resonator and the second resonator are configured to flexibly connect the proof mass to the support base and flex based on a displacement of the proof mass.

6. The device of claim 5, wherein at least one of the first resonator and the second resonator comprise a DETF.

7. The device of claim 5, wherein the first resonator is within a threshold number of degrees of parallel to the second resonator,
wherein the strain-monitoring DETF is located outside of and adjacent to the at least two resonators, and
wherein the strain-monitoring DETF is positioned within a threshold number of degrees of perpendicular to the first resonator and the second resonator.

8. The device of claim 5, wherein the strain-monitoring DETF is located proximate to one or more support connections between the first resonator and the second resonator and the support base.

9. The device of claim 1, wherein the spring is a first spring, the device further comprising and a second spring, wherein
the second spring is configured to directly couple a second end of the strain-monitoring DETF to the support base.

10. The device of claim 1, wherein the proof mass, the support base, the flexure, the strain-monitoring DETF are comprised of a monolithic material.

11. The device of claim 10, wherein the monolithic material is at least one of quartz or silicon.

* * * * *